Figure 1:
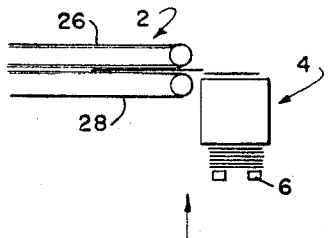

July 16, 1968   P. V. TEGNER   3,392,852

STACKING AND PALLETIZING SYSTEM AND METHOD

Filed June 22, 1966   3 Sheets-Sheet 1

PETER V. TEGNER
*INVENTOR.*

BY *Beale and Jones*

ATTORNEYS

3,392,852
STACKING AND PALLETIZING SYSTEM
AND METHOD
Peter V. Tegner, 234 Bala Ave.,
Philadelphia, Pa. 19004
Filed June 22, 1966, Ser. No. 559,458
16 Claims. (Cl. 214—6)

This invention relates to a machine and a method for stacking and palletizing flat planar members such as flat milk carton blanks which are produced in the paper products industry. The invention involves not only the overall combination of mechanisms illustrated in the drawings and described in the following specification, but also certain subcombinations which contribute to the overall effectiveness of the system.

Modern production machinery used in the paper products industry is capable of cutting, assembling and printing carton blanks or other flat products at a remarkably high rate. Once the products are completed, it is necessary to assemble a plurality of them into some type of unit which may conveniently be transported to distribution points and to the ultimate users. Currently, the industry is faced with a need for a machine for so assembling paper products or other materials which can keep pace with production machinery. The system disclosed herein is a most satisfactory answer to this need.

A significant consideration in the adoption of any industrial equipment of this type is that it occupys a minimum of space without the sacrifice of efficiency. In this respect, too, the present invention meets the demands of the modern manufacturing concern.

From the foregoing background information, it is apparent that a principal object of this invention is to provide a materials handling system and method which combines the advantages of high speed and minimal space requirements. Another object is to provide such a system which includes an efficient combination of operating mechanisms which together will result in a machine requiring a minimum of maintenance and repair service.

Another object is to provide an effective mechanism for stacking milk carton blanks or other planar members. In part, the stacking mechanism includes a box-like device with side walls and a movable bottom which serves as the stack supporting surface. A weight-responsive switch has its actuating lever near the top of the box and extending into the box. As the weight of cartons acting on the switch causes the switch to close, the stack supporting surface is lowered an incremental amount. The upper level of the stack will thus remain at about the same height at all times in order to permit more accurate deposition of new carton blanks on the top of the stack.

Another object of this invention is to provide a simple and effective means for arranging and depositing, on a pallet, a plurality of packages such as stacks of carton blanks. The satisfaction of this object is achieved through the use of a thin plate, the top surface of which permits convenient low frictional sliding of the packages or stacks into the desired array. Beneath the plate, there is a pallet receiving space. This permits the pallet to provide support for the thin plate and packages thereon. The packages and the pallet are moved from the plate simultaneously and, as they reach the edge of the plate, the packages are laid in proper form directly on the pallet.

Still another object of the invention is to provide the above-described palletizing station with a package pushing device which may be used both for arranging the packages on the top of the plate and for removing the pallet and the packages from the plate. This pushing device is movable through a minor stroke to move the packages onto that portion of the plate which overlies the pallet and then, at the end of the loading process, it moves through a major stroke in which it removes the packages and the pallets from the plate.

The system of this invention has a series of interrelated mechanisms which serve to stack the planar members, convey them to the package arranging plate, arrange them in the desired order on the plate, and then move them from the plate onto the pallet and then to a shipping area. Ancillary devices are used to supply the planar members to the stacking machine and to feed and locate the empty pallets in the pallet receiving space beneath the thin sheet. All of these mechanisms are disclosed in somewhat diagrammatic form herein, since the details of various sensing, actuating and conveying means are not of critical significance and are readily within the knowledge and capability of those experienced in the conveying and material handling arts.

The system of this invention and its elemental mechanisms may take a wide variety of forms. Only the preferred embodiment contemplated at this time is shown in the accompanying drawings and described in the written specification.

Figure 2:
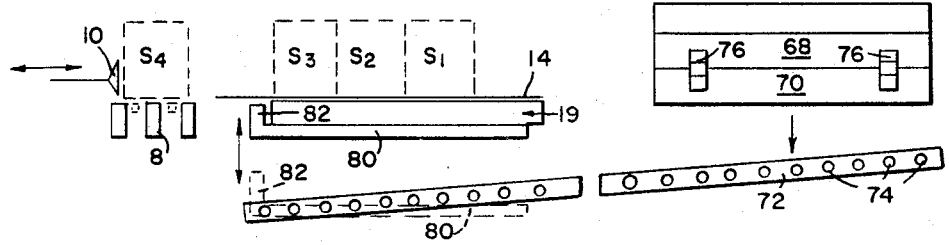
Figure 2:
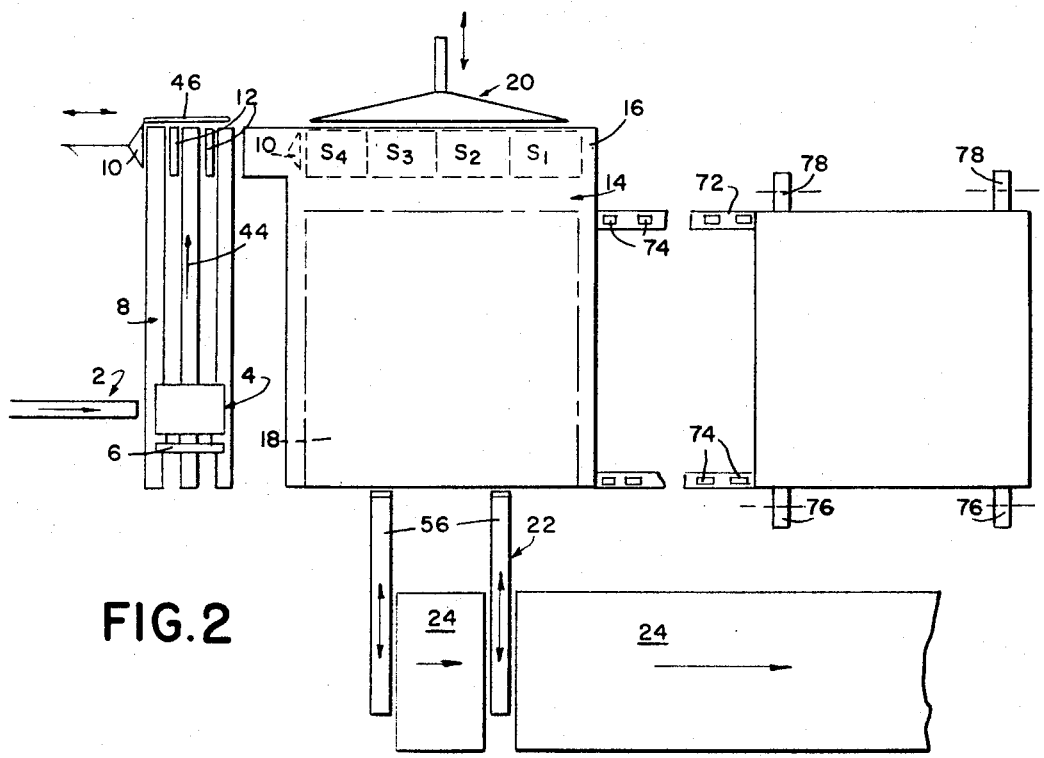
Figure 3:
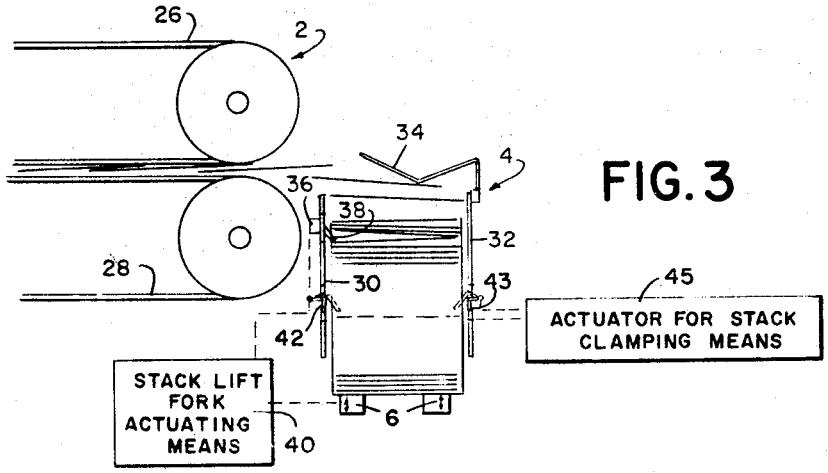
Figure 4:
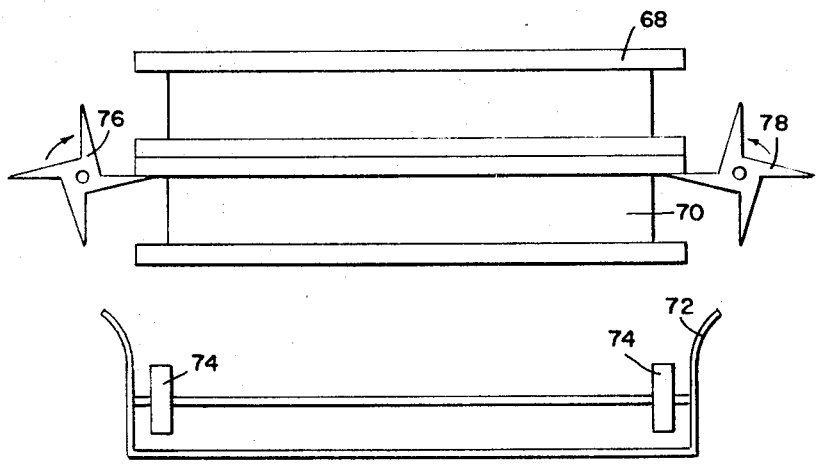

FIG. 1 is a diagrammatic front elevation of the system;
FIG. 2 is a diagrammatic plan view of the system;
FIG. 3 is an enlarged view of the stack forming box;
FIG. 4 is an elevation of the empty pallet dispenser; and
FIGS. 5a to 5f illustrate the sequences of arranging the packages on the thin plate, ejecting the packages and a pallet from the plate and transferring the loaded pallet onto a full pallet conveyor.

The overall operation of the system and the interrelation of the various mechanisms are best understood by referring to FIGS. 1 and 2. Broadly, there is the first conveyor means 2 which introduces carton blanks or other flat planar members into the system at a high velocity. The carton blanks fall or are deflected into the receiving and stacking means 4 which has side walls that confine the carton blanks as a stack is formed. The fork 6 which provides a supporting surface for the stack moves downwardly upon the addition of new carton blanks to the receiving and stacking means 4. Upon the accumulation of a stack of the desired height, the lift fork 6 moves downwardly to a position where the stack will rest upon the stack conveyor 8. Movement of the stack conveyor 8 will carry the stack horizontally to a position adjacent the stack pusher 10 which is best illustrated in FIG. 2. Rollers 12 located between the belts of conveyor 8 are elevated to raise the stack slightly from the belts and facilitate movement of the stack laterally off of the stack conveyor 8. The stack pusher 10 moves the stack to the right onto the plate 14 upon which the stacks are arranged before being deposited directly upon a pallet.

Referring to FIG. 2, it will be noted that a plurality of stacks have been moved onto the stationary arranging plate 14 to a position where they lie in a row at a transverse end portion 16 of the plate 14. Beneath the plate, and spaced from the end portion 16, is a receiving space 18 for empty pallets designated by broken lines in FIG. 2. When the plate 14 is being loaded, the empty pallet receiving space 18 contains a pallet 19 which is in contacting relationship with the underside of the plate 14 in the manner illustrated in FIG. 1.

Upon the completion of each row of stacks, that complete row is pushed across the plate 14 from the end portion 16 of the plate to the portion of the plate which overlies the pallet receiving space 18. The pushing of rows in this manner is accomplished by the pusher 20 which is shown in FIG. 2.

Once the plate 14 carries enough packages to complete the loading of a single pallet 19, arranged in the desired manner, the pusher 20 moves both the packages and the pallet from the plate and onto the transfer conveyor 22. From the transfer conveyor, the loaded pallet is placed upon another conveyor 24 which carries it to a station for shipping or further handling.

Having thus described the overall operation of the machine in brief form, some of the refinements of the various mechanisms will be set forth in the following paragraphs.

*Receiving and stacking mechanism*

In FIG. 3, it will be observed that the carton blanks incoming to the receiving and stacking mechanism 4 are fed by the conveyor 2 having a pair of parallel coacting endless belts 26 and 28, between which the carton blanks are frictionally held. The uppermost belt 26 functions as a hold-down belt, maintaining the carton blanks in the overlapping relationship illustrated in which the forward end of each blank extends over the rearward end of the immediately adjacent blank for a distance of about ¼ the length of a single carton blank. The conveyor drive speed is governed by the printing converter speed to maintain a constant blank overlap during converter acceleration and deceleration. These belts 26 and 28 operate at a speed in excess of 1000 feet per minute, and preferably in the range of 1200–1400 feet per minute. The conveyor thus imparts a horizontal velocity to the blanks and releases them in the vicinity of the receiving and stacking means 4.

The receiving and stacking means 4 is a box of receptacle-like device having four vertically oriented side walls such as 30 and 32, and a vertically movable stack supporting surface such as the upper surfaces of the tines of stack lift fork 6.

A resilient deflector such as spring 34 is attached to a point adjacent the upper end of the side wall 32. This spring has a portion which is located in the path of the blanks which are discharged by the belts 26 and 28, and it is inclined with respect to the path of the incoming blanks so that the blanks will be deflected into the receiving and stacking means 4. The partial overlapping of the carton blanks also encourages downward movement of the blanks into the receiving and stacking means.

Near the top of the side wall 30, adjacent the first conveyor 2, there is a switch 36 with a pivoted lever 38 which extends into the space between the side walls 30 and 32. The switch includes a spring (not illustrated) which biases the lever 38 inwardly to the position shown in FIG. 3 at an angle of about 30° to the side wall 30. This spring is of sufficient strength that it does not permit passage of a single carton blank past the lever 38. Only after a number of carton blanks have accumulated above the lever 38, in the manner shown in FIG. 3, will the weight of the blanks be sufficient to overcome the force exerted by the spring. When this happens, the blanks pass the lever 38 and the switch emits a signal which energizes the stack lift fork actuating means illustrated diagrammatically at 40. This causes a small downward movement of the stick lift fork 6 so that the height of the blanks with respect to the side walls 30 and 32 will remain substantially constant. This is particularly desirable when members are being stacked at a high speed, since the location of the top surface of the stack, if it were permitted to vary appreciably, would introduce an undesirable variation to the stacking process.

When the stack lift fork 6 has been lowered to a certain predetermined point at which the stack is of the desired final height, the lift fork 6 is lowered at an accelerated rate in order to deposit the stack on the stack conveyor 8 illustrated in FIGS. 1 and 2. As shown in FIG. 1, the lift fork 6 is arranged so that the tines and the stack supporting surfaces will fit between the spaced apart belts which constitute the stack conveyor 8.

In order to prevent additional carton blanks from falling onto a stack which is lowering at an accelerated rate, in the manner described above, there are provided a pair of stack clamping devices 42 and 43. These clamping devices in the illustrated embodiment are relatively small arm members which are pivotally mounted to the two opposed side walls 30 and 32. A solenoid or other means indicated only schematically at 45 may serve as an actuator to incline them inwardly as illustrated in broken lines and prevent any additional carton blanks from falling from between side walls 30 and 32.

Once the stack lift fork has deposited a completed stack on the stack conveyor 8, the stack conveyor will move the stack horizontally and permit the lift fork 6 to move to its upper position between the side walls 30 and 32 and to support the next stack which is being formed. Upon the return of the lift fork 6 to its uppermost position, the stack clamping devices 42 and 43 are released so that a stack may freely be formed.

*Stack arranging and palletizing mechanism*

As discussed above, after the stacks have been formed, they are lowered by the stack lift fork onto the stack conveyor 8 which moves in the direction indicated by the arrow 44 in FIG. 2. At the discharge end of the stack conveyor 8 there is an abutment plate 46 attached to the stack pusher 10 which prevents the stack from travelling off the end of the conveyor. When a stack reaches this position, the rollers 12 are automatically elevated to lift the stack slightly off of the conveyor. The rollers 12 are so oriented that they permit convenient movement of the stack in a direction parallel to the movement of the stack pusher 10.

Once the stack is located adjacent the stack pusher 10 and the rollers 12 are elevated, the pusher reciprocates in a direction which will move the stack onto the stack arranging plate 14.

The plate 14 is relatively thin and it has a smooth upper surface which permits movement of the stack with a minimum of frictional resistance. The thinness of the plate facilitates removal of the stacks from the plate and their accurate deposition on the pallet with a minimum of disruption of stack orientation. The plate, due to its thinness, is incapable of supporting by itself a heavy load such as a large quantity of the stacks. However, in this apparatus, the empty pallet 19 is in contacting and supporting relationship with the underside of the plate and thus it lends structural strength to the assembly.

As mentioned above, the stacks are moved onto the plate 14 by means of the stack pusher 10. Each stroke of the stack pusher 10 brings it forward the same distance to the position indicated by the broken lines shown in FIG. 2. Thus, when second, third or fourth stacks are moved to this position, they will also move ahead the preceding stacks which were placed on the end portion 16 of the plate. FIG. 1 shows the apparatus in a condition where the fourth stack which completes a row is in a position in which it may be moved onto the sheet 14. Upon completion of its movement, the row would appear as illustrated in FIG. 2.

It is to be noted that the stacks are arranged in a row at the end portion 16 of the plate 14 which is spaced horizontally from the pallet receiving space 18. The reason for this arrangement will become more apparent in the following discussion of FIG. 5.

Upon the completion of a row of stacks, such as shown in FIG. 2, this condition is sensed and the reciprocating pusher means 20 is automatically actuated to move the row longitudinally on the plate to a position above the pallet receiving space.

Referring to FIG. 5, it will be seen that the reciprocating pusher means 20 includes a work contacting surface 48 above the plate and another work contacting surface 50 below the plate. These work contacting surfaces may be actuated automatically upon completion of a row by hydraulic or electro-mechanical means which are well within the designing capabilities of those familiar with the art. The actuating means which is common to both of these pusher surfaces 48 and 50 is illustrated in FIG. 5a diagrammatically at 52.

Figure 5A:
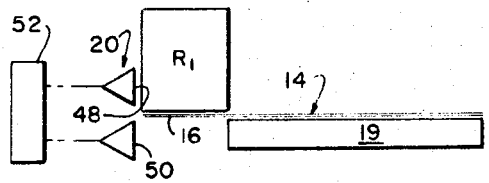
Figure 5B:
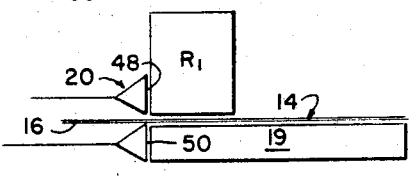

When the reciprocating pusher means 20 is ready to move a first row $R_1$ of the stacks from the transverse end portion 16 of the plate to that portion of the plate overlying the pallet 19, it is in the position shown in FIG. 5a. Then, upon automatic actuation of means 20, the entire row $R_1$, is moved longitudinally onto the portion of the plate above the pallet.

Figure 5C:
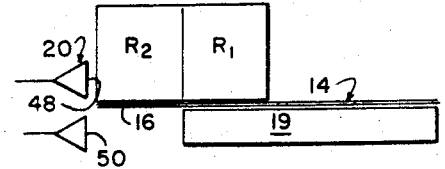
Figure 5D:
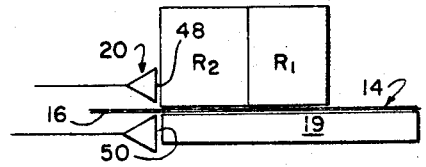
Figure 5E:
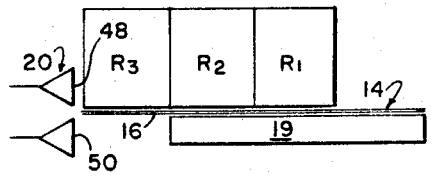
Figure 5F:
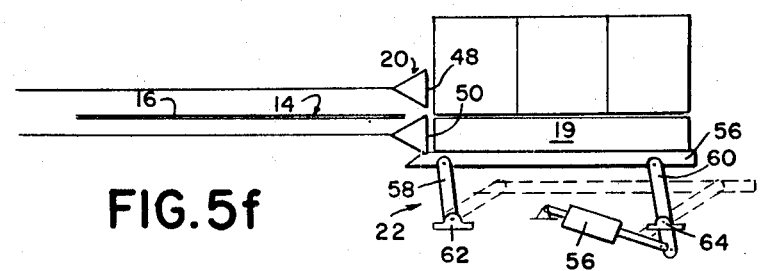

FIG. 5c shows the apparatus upon the completion of a second row $R_2$ of stacks. Again, as in FIG. 5b, the pusher means 20 including the work contacting surfaces 48 and 50 moves through a minor stroke to push all of the stacks in both rows $R_1$ and $R_2$ to a position on the plate 14 above the pallet 19. This is shown in FIG. 5d. In FIG. 5e, a third complete row $R_3$ of stacks is shown on the end portion 16 of the arranging plate 14. For purposes of this example, it is assumed that only three rows will complete a pallet load. Once the plate 14 carries enough stacks to load the pallet to capacity as in FIG. 5e, the work contacting surfaces 48 and 50 are moved through a major stroke which, in this case, is approximately four times the length of the above-described minor strokes. As is shown in FIG. 5f, upon the major stroke the work contacting surfaces 48 and 50 move the stacks onto positions above the pallet, and then continue in order to move the pallet and the rows to a position displaced horizontally from the sheet 14. As mentioned briefly above, the thinness of the sheet permits the stacks to fall onto the pallet with a minimum of disturbance of the relative positions of the stacks.

When the loaded pallet is pushed from the sheet 14, it slides upon a third or transfer conveyor 22 which includes a pair of horizontal support bars 56 supported upon a series of pivoted arms such as 58 and 60. These arms at their lower ends are journalled in the bearing blocks 62 and 64 so that movement to the position indicated in broken lines in FIG. 5f is permitted upon actuation of the hydraulic device 66. This actuation lowers the loaded pallet to a position where it contacts the conveyor 24 which is shown in FIG. 2.

*Pallet dispensing and conveying mechanism*

Upon the discharge of a completed pallet from the plate 14, it is desired automatically to locate another empty pallet in the pallet receiving space 18. This is done by means of the pallet dispensing mechanism shown in FIG. 4, a gravity conveyor and an elevatable pallet lift device.

Referring to FIG. 4, it will be seen that a pair of empty pallets 68 and 70 are in stacked relationship directly above a gravity trackway conveyor 72 which has conventional roller wheels 74. The pallets 68 and 70 are prevented from contacting the gravity conveyor 72 since they are suspended thereabove by a pair of rotatable dispensing wheels 76 and 78.

Upon the discharge of a loaded pallet from the sheet 14, the dispensing wheels 76 and 78 automatically rotated ¼ of a revolution in order to dispense only the lowermost pallet 70 in the stack. The pallet falls on the gravity conveyor 72 and the roller wheels 74. As shown in FIG. 1, the conveyor is inclined and leads to the pallet lift fork 80. When a pallet is discharged onto the gravity conveyor 72, the pallet lift fork 80 is lowered to the position indicated in broken lines in FIG. 1 where its upstanding end portion 82 will arrest the movement of the incoming empty pallet. When the pallet strikes the end portion 82, the lift fork 80 is automatically elevated to hold the pallet in the position illustrated in solid lines in FIG. 1. As mentioned above, the pallet will then contact the underside of the plate 14 and lend structural support thereto.

*Operation*

The overall operation of the system and its ability to operate rapidly and efficiently will be recognized from the foregoing description. The opposed belt conveyor 2 introduces the carton blanks to the device and imparts to them a high velocity. The carton blanks discharged from the conveyor 2 are intercepted by the spring 34 shown in FIG. 3, and then fall with one edge lying against the lever 38 of switch 36 in the stack forming box. The lower portion of the formed stack is supported by the stack lift fork 6. After a few carton blanks have accumulated above the lever 38 of switch 36, their weight will overcome the biasing spring located within the switch so that they will move downwardly onto the stack. This actuation of the switch sends a signal to the stack lift fork actuating means 40 which will lower the stack lift fork 6 one incremental step. By doing this, the upper surface of the stack will remain at a substantially constant level to stabilize the stacking ability of the device. When a stack of the desired height has accumulated, the stack lift fork 6 lowers rapidly. The stack clamping devices 42 and 43 are actuated so that they extend within the side walls 30 and 32 to prevent the falling of any additional blanks onto the stack. The stack lift fork then deposits the stack on the stack conveyor 8.

The stack conveyor 8 moves the stack horizontally as the stack lift fork 6 ascends. The stack clamping devices 42 and 43 are released and the normal formation of a stack continues between the side walls 30 and 32 of the stack forming device 4.

When the stack previously deposited on the stack conveyor 8 reaches the abutment plate 46 attached to the stack pusher 10, the rollers 12 are raised and the pusher is moved transversely with respect to the plate to push the stack onto the plate.

Upon the completion of a row of stacks on the plate, as is shown in FIG. 2, there is automatic actuation of the reciprocating pusher 20 which includes the work contacting surfaces 48 and 50 shown in FIG. 5. This pusher moves through a minor stroke upon the completion of the first rows of a pallet load.

When the row which will complete a pallet load is formed on the end portion 16 of plate 14, the reciprocating pusher means 20 is moved through a major stroke as shown in FIG. 5f, pushing the stacks and the pallet away from the sheet 14 and depositing the stacks directly upon the pallet. Then, by means of the transfer conveyor 22, the assembled palletized unit is lowered onto a conveyor 24 which leads it to areas for further handling.

*Summary*

From the above description, it will be appreciated that the present invention does provide an efficient system which utilizes relatively little space and which is efficient in the performance of its intended functions. This description has been directed specifically to the stacking of carton blanks and the assembly of them into a palletized unit. It is obvious that the invention may be applied to other materials handling situations involving either the stacking of planar devices or the handling of individual boxes or packages rather than stacks.

Numerous modifications to the apparatus and method will be recognized by those working in the art. Such modifications, as well as the illustrated embodiment, are deemed to be within the scope of the claims which follow.

I claim:

1. A machine for stacking and palletizing flat planar members comprising
   (a) first conveyor means including a pair of parallel coacting endless belts movable at high speeds and having opposed facing surfaces for frictionally holding therebetween a plurality of partially overlapping planar members with the forwardmost end of each planar member overlying the rearward end of the immediately adjacent planar member;
   (b) receiving and stacking means located at the discharge end of said belts for receiving said planar members from said first conveyor means and arranging them in a vertical stack, said receiving and stacking means having stationary vertical side walls for arranging in a vertical stack said planar members falling into said receiving and stacking means, resilient deflector means located on one of said side walls in the path of planar members discharged from said belts and inclined with respect to said path in a position to cause deflection of said planar members into the space surrounded by said side walls, a stack supporting surface located intermediate said side walls and being downwardly movable in incremental steps; stack clamping devices pivotally attached to two opposed said side walls and being positively movable inwardly upon actuation to engage said blanks, means lowering said stack supporting surface to maintain the top of said stack being formed at a substantially constant height with respect to said side walls;

(c) a plate with a receiving space for an empty pallet therebelow, means for lifting a pallet into supporting and contacting engagement of its upper surface with the undersurface of said plate, said plate being of a thinness so as to be incapable of supporting the pallet load, which plate, under load, flexes downwardly to transmit the weight of the load to the pallet;

(d) means for transferring said stacks individually in a single direction to said plate to form a row of said stacks extending transversely across said plate;

(e) reciprocable pusher means with work contacting surfaces above and below said plate being movable longitudinally through a minor stroke with respect to said plate to advance a line of said stacks onto a portion of said plate overlying said pallet, said pusher means being movable through a major stroke at the completion of the assembly of a complete pallet load on said plate in order to advance both the pallet and the assembled stacks in a direction away from said plate whereby the stacks are deposited on said pallet and displaced from said plate.

2. The machine of claim 1 having second conveyor means for receiving individual stacks of planar members from said stack supporting surface at a point directly beneath said receiving and stacking means and transferring them to a station horizontally spaced from said receiving and stacking means and adjacent said transferring means.

3. The machine of claim 1 having means for dispensing empty pallets and for conveying them to said pallet receiving space.

4. The machine of claim 1 wherein said means for transferring the stacks places said stacks on an area of the plate which is spaced horizontally from the pallet receiving space, both of said work contacting surfaces of said pusher means being movable through parallel and coincident strokes at all times.

5. The machine of claim 1 in which said receiving and stacking means has a pivotable sensing lever attached to one of said side walls and extending inwardly into the area between the side walls to obstruct downward movement of said planar members, biasing means urging said sensing lever inwardly, means for emitting a signal when the weight of said planar members overcomes said biasing means to move said lever outwardly to permit passage of said planar members, and means for moving said stack supporting surface downwardly in incremental steps in response to signals from said signal emitting means.

6. The machine of claim 5 wherein said means for transferring the stacks places said stacks on an area of the plate which is spaced horizontally from the pallet receiving space, both of said work contacting surfaces of said pusher means being movable through parallel and coincident strokes at all times.

7. The machine of claim 6 having means for dispensing empty pallets and for conveying them to said pallet receiving space.

8. A machine for palletizing goods comprising:
(a) a plate with an upper surface adapted to receive packages of goods;
(b) means for conveying a package to a transverse portion of said plate;
(c) means for lifting a pallet into supporting and contacting engagement of its upper surface with the undersurface of said plate and located within a pallet receiving space below said plate, said plate being of a thinness so as to be incapable of supporting the pallet load, which plate, under load, flexes downwardly to transmit the weight of the load to the pallet;
(d) pusher means located adjacent said transverse portion of said plate having work contacting surfaces above and below said plate, said work contacting surface above said plate being engageable with said package, said work contacting surface below said plate being engageable with said pallet in said pallet receiving space;
(e) actuator means for moving said pusher means through a minor stroke to move a package longitudinally on said plate only from said transverse portion to the portion of the plate overlying said pallet receiving space, and upon the introduction of a package which will complete a pallet load, to move said pusher means through a major stroke in which said work contacting surfaces will contact a package and a pallet to expel the packages and the pallet horizontally from said plate; whereby said packages will contact and rest upon the pallet as they move across an edge of said plate.

9. A machine as defined in claim 8 in which said plate is relatively thin in the portion overlying said pallet receiving space, a pallet in said pallet receiving space having its upper surface in contact with said plate to provide structural support to said plate as packages are deposited thereon.

10. A machine as defined in claim 8 in which said conveying means deposits a transverse row of packages on said transverse portion of said plate, and said work contacting surface of said pusher means located above said plate contacts simultaneously all packages in an entire said row of packages.

11. A machine as defined in claim 8 having means for dispensing empty pallets and for conveying them to said pallet receiving space.

12. A machine for palletizing goods comprising:
(a) a plate with an upper surface adapted to receive packages of goods;
(b) means for conveying packages to the upper surface of said plate;
(c) means for lifting a pallet into supporting and contacting engagement of its upper surface with the undersurface of said plate and located within a pallet receiving space below said plate, said plate being of a thinness so as to be incapable of supporting the pallet load, which plate, under load, flexes downwardly to transmit the weight of the load to the pallet;
(d) pusher means having work contacting surfaces located above and below said plate, said work contacting surface above said plate being engageable with said packages, said work contacting surface below said plate being engageable with said pallet in said pallet receiving space; and
(e) actuator means for moving said pusher means through a stroke in which both said work contacting surfaces will move through parallel and coincident strokes above said plate and through said pallet receiving space; whereby a pallet and packages will move from said plate at a same velocity and direction relative to said plate, and the packages will become deposited on the pallet.

13. A machine as described in claim 12 in which said pallet receiving space contains a pallet support, means for moving said pallet support upwardly into physical contact with the underside of said plate; whereby a pallet contacting said plate will provide support to said plate and to the packages lying on said plate.

14. A machine as described in claim 12; whereby the thinness of said plate is capable of permitting deposition of packages upon a pallet upon movement of said pusher means with a minimum of disturbance of the relative positions of the packages.

15. A machine as defined in claim 12 having means for dispensing empty pallets and for conveying them to said pallet receiving space.

16. The method of stacking and palletizing flat planar members, including the steps of:
  (a) imparting a horizontal velocity to said planar members and then releasing said members;
  (b) catching said planar members in a receptacle having vertical side walls and a vertically movable horizontal bottom wall;
  (c) lowering said bottom wall as a stack is being formed in said receptable to maintain the top of said stack at a substantially constant level;
  (d) lowering said bottom wall at an accelerated rate upon the accumulation of a stack of the desired height, while simultaneously interrupting the downward movement of said planar members arriving at said receptacle;
  (e) conveying said stack onto a thin plate having low frictional characteristics beneath which is located a pallet; lifting the pallet into a supporting and contacting engagement of its upper surface with the undersurface of said plate prior to the conveying of said stack onto the plate, said plate being of a thinness so as to be incapable of supporting the pallet load, which plate, under load, flexes downwardly to transmit the weight of the load to the pallet;
  (f) arranging on said plate a plurality of said stacks formed as described above;
  (g) simultaneously moving the packages on said plate and said pallet in a same direction and at a same velocity until said packages are deposited on said pallet.

References Cited
UNITED STATES PATENTS 2,979,872    4/1961    Verrinder _____ 214—6

ROBERT G. SHERIDAN, *Primary Examiner.*

R. J. SPAR, *Assistant Examiner.*